United States Patent
Mangaiahgari

(10) Patent No.: US 10,468,736 B2
(45) Date of Patent: Nov. 5, 2019

(54) RADAR ASSEMBLY WITH ULTRA WIDE BAND WAVEGUIDE TO SUBSTRATE INTEGRATED WAVEGUIDE TRANSITION

(71) Applicant: Aptiv Technologies Limited, St. Michael (BB)

(72) Inventor: Sankara Narayana Mangaiahgari, Singapore (SG)

(73) Assignee: APTIV TECHNOLOGIES LIMITED (BB)

( * ) Notice: Subject to any disclaimer, the term of this patent is extended or adjusted under 35 U.S.C. 154(b) by 134 days.

(21) Appl. No.: 15/427,769

(22) Filed: Feb. 8, 2017

(65) Prior Publication Data
US 2018/0226709 A1    Aug. 9, 2018

(51) Int. Cl.
*H01P 3/12*     (2006.01)
*H01P 5/02*     (2006.01)
*G01S 13/02*    (2006.01)

(52) U.S. Cl.
CPC ......... *H01P 3/121* (2013.01); *G01S 13/0209* (2013.01); *H01P 5/024* (2013.01)

(58) Field of Classification Search
CPC .. H01P 3/121; H01P 5/024; H01P 5/02; H01P 3/12; H01P 3/16; H01P 1/047; H01P 5/082; H01P 5/107; H01P 5/087; H01P 5/1022; G01S 13/0209; H01Q 21/0075
See application file for complete search history.

(56) References Cited

U.S. PATENT DOCUMENTS

| | | | | |
|---|---|---|---|---|
| 3,462,713 A | * | 8/1969 | Knerr | H01P 5/107 333/21 R |
| 3,579,149 A | * | 5/1971 | Ramsey | H01P 5/107 333/26 |
| 4,157,516 A | * | 6/1979 | van de Grijp | H01P 5/107 333/246 |

(Continued)

FOREIGN PATENT DOCUMENTS

| | | | | |
|---|---|---|---|---|
| EP | 2500978 A1 | * | 9/2012 | H01P 5/082 |
| GB | 2489950 A | * | 10/2012 | H01P 5/087 |

(Continued)

OTHER PUBLICATIONS

Jankovic U et al: "Stepped bend substrate integrated waveguide to rectangular waveguide transitions", Jun. 26, 2016, pp. 1231-1232.

*Primary Examiner* — Bernarr E Gregory
(74) *Attorney, Agent, or Firm* — Joseph V. Bonadies

(57) ABSTRACT

A radar assembly includes a rectangular-waveguide (RWG) and a printed-circuit-board. The rectangular-waveguide (RWG) propagates electromagnetic energy in a transverse electric mode (TE10) and in a first direction. The printed-circuit-board includes a plurality of conductor-layers oriented parallel to each other. The printed-circuit-board defines a substrate-integrated-waveguide (SIW) that propagates the electromagnetic energy in a transverse electric mode (TE10) and in a second direction perpendicular to the first direction, and defines a transition that propagates the electromagnetic energy between the rectangular-wave-guide and the substrate-integrated-waveguide. The transition includes apertures defined by at least three of the plurality of conductor-layers.

4 Claims, 2 Drawing Sheets

(56) References Cited

U.S. PATENT DOCUMENTS

| | | | | |
|---|---|---|---|---|
| 4,453,142 | A * | 6/1984 | Murphy | H01P 5/107 333/26 |
| 4,562,416 | A * | 12/1985 | Sedivec | H01P 5/107 333/246 |
| 5,982,256 | A * | 11/1999 | Uchimura | H01P 1/047 333/239 |
| 5,986,527 | A * | 11/1999 | Ishikawa | H01P 3/16 333/239 |
| 6,794,950 | B2 * | 9/2004 | du Toit | H01P 5/107 333/21 R |
| 6,958,662 | B1 | 10/2005 | Salmela et al. | |
| 8,089,327 | B2 * | 1/2012 | Margomenos | H01P 5/107 333/128 |
| 9,450,281 | B2 * | 9/2016 | Kim | H01P 5/024 |
| 9,673,532 | B2 * | 6/2017 | Cheng et al. | H01P 5/024 |
| 2002/0021197 | A1 * | 2/2002 | Elco | H01P 3/12 333/248 |
| 2008/0129409 | A1 | 6/2008 | Nagaishi et al. | |
| 2008/0150821 | A1 * | 6/2008 | Koch | H01Q 21/0075 343/776 |
| 2012/0013421 | A1 * | 1/2012 | Hayata | H01P 5/02 333/239 |
| 2012/0242421 | A1 * | 9/2012 | Robin | H01P 5/107 333/26 |
| 2015/0357698 | A1 | 12/2015 | Kushta | |
| 2016/0049714 | A1 * | 2/2016 | Ligander et al. | H01P 5/082 |

FOREIGN PATENT DOCUMENTS

| | | | | |
|---|---|---|---|---|
| JP | 2003-289201 A | 10/2003 | | |
| WO | WO2013/189513 A1 * | 12/2013 | | H01P 5/087 |

* cited by examiner

US 10,468,736 B2

RADAR ASSEMBLY WITH ULTRA WIDE BAND WAVEGUIDE TO SUBSTRATE INTEGRATED WAVEGUIDE TRANSITION

TECHNICAL FIELD OF INVENTION

This disclosure generally relates to a radar assembly, and more particularly relates to a transition between a rectangular-waveguide (RWG) and a substrate-integrated-waveguide (SIW) where the transition includes apertures defined by at least three of a plurality of conductor-layers of a printed circuit board that also defines the SIW.

BACKGROUND OF INVENTION

Wideband Transitions are used in wide band radar systems such as Automotive Radar. Known transitions with sufficient bandwidths include undesirably expensive waveguide flanges or metal structures, where critical tolerances add to the cost.

SUMMARY OF THE INVENTION

Described herein is a wideband transition that is formed using standard printed circuit board (PCB) processes, so is able to avoid using expensive waveguide flanges or metal structures. The non-limiting example described herein provides a transition between a Rectangular Waveguide (RWG) to a Substrate Integrated Waveguide (SIW) suitable for use with, for example, electromagnetic energy having a 16 GHz bandwidth around a 79 GHz fundamental frequency. The transition is suitable for compact multilayer printed circuit board (PCB) construction like Ultra Short Range Radar (USRR), using standard PCB fabrication processes.

In accordance with one embodiment, a radar assembly is provided. The assembly includes a rectangular-waveguide (RWG) and a printed-circuit-board. The rectangular-waveguide (RWG) propagates electromagnetic energy in a transverse electric mode (TE10) and in a first direction. The printed-circuit-board includes a plurality of conductor-layers oriented parallel to each other. The printed-circuit-board defines a substrate-integrated-waveguide (SIW) that propagates the electromagnetic energy in a transverse electric mode (TE10) and in a second direction perpendicular to the first direction, and defines a transition that propagates the electromagnetic energy between the rectangular-wave-guide and the substrate-integrated-waveguide. The transition includes apertures defined by at least three of the plurality of conductor-layers.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
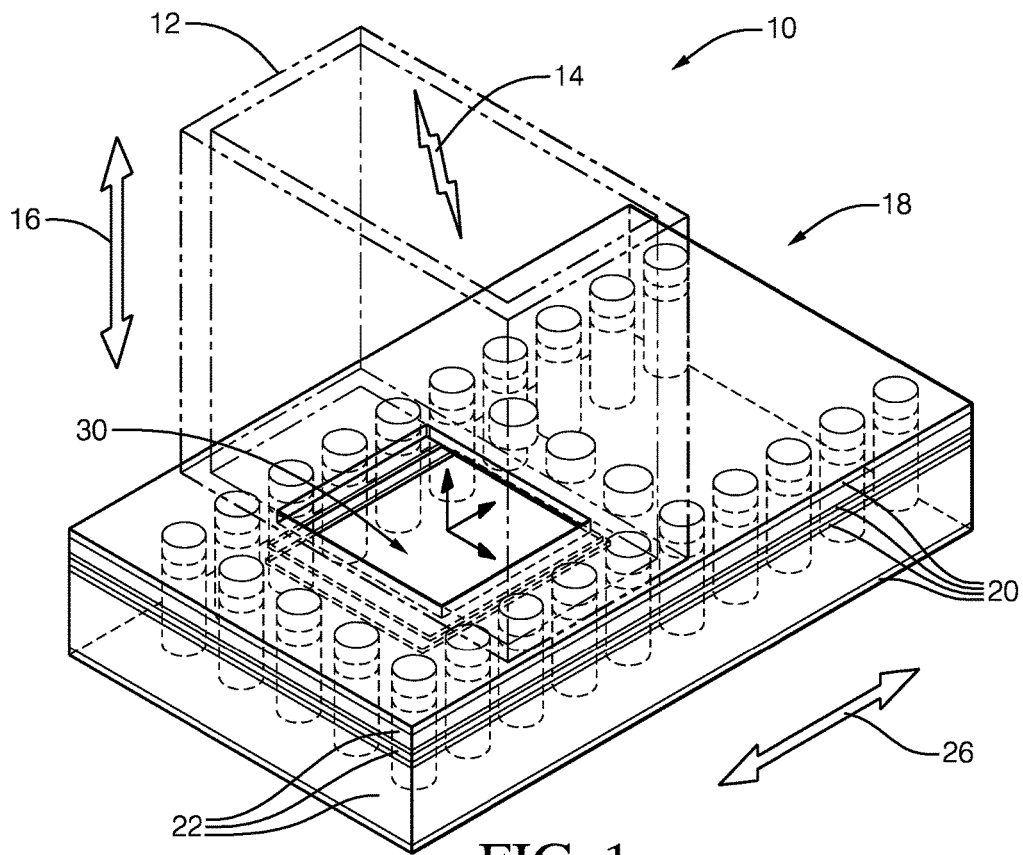
FIG. 1 is an isometric view of a radar assembly in accordance with one embodiment.
Figure 2:
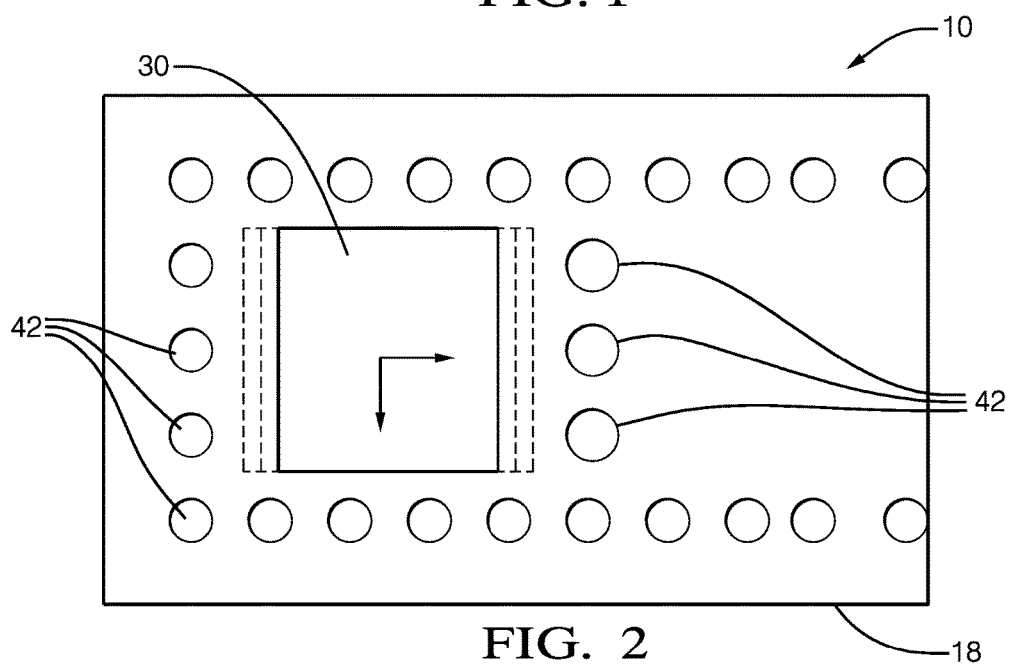
FIG. 2 is top view of part of the radar assembly of FIG. 1 in accordance with one embodiment.
Figure 3:
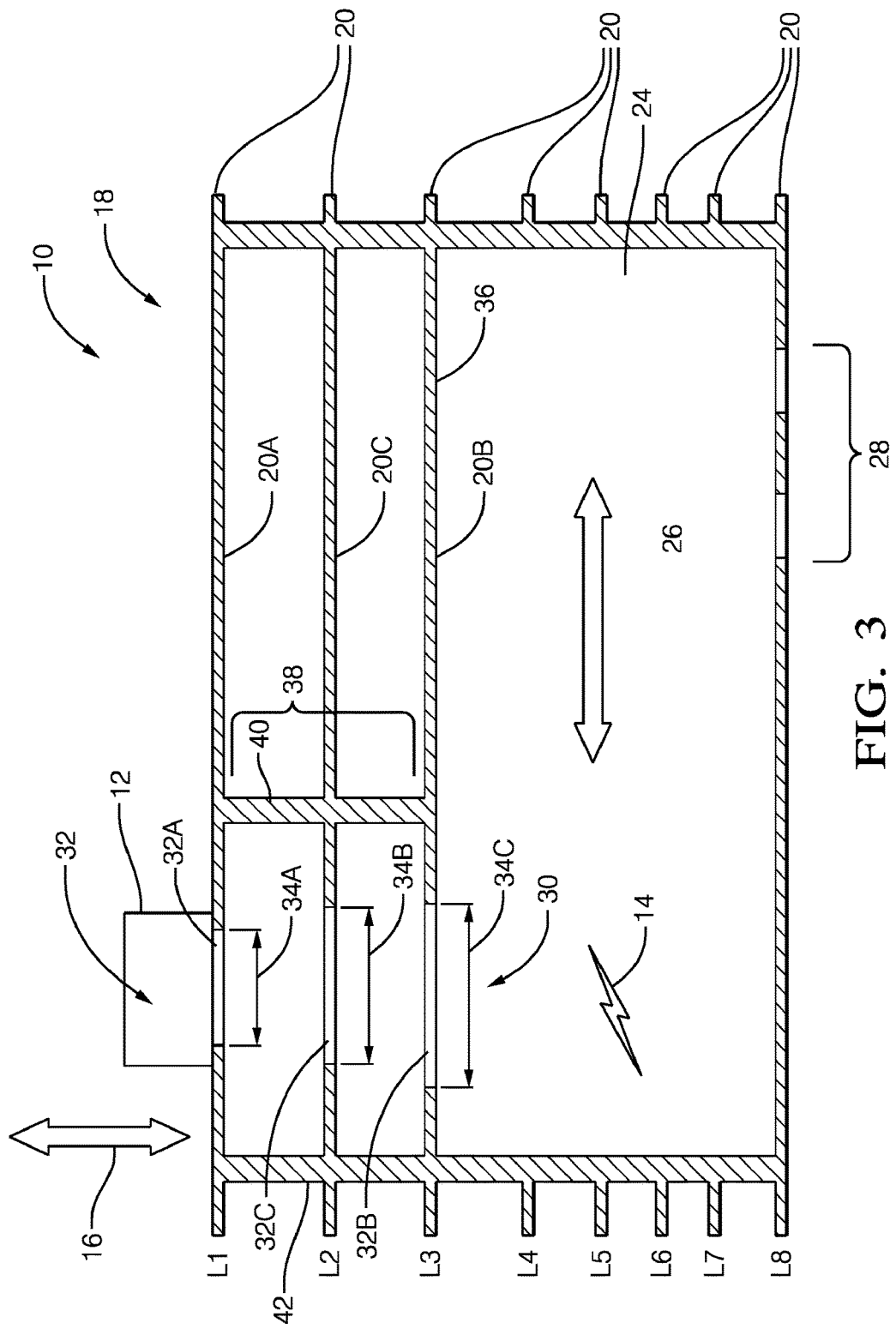
FIG. 3 is sectional side view of part of the radar assembly of FIG. 1 in accordance with one embodiment.

FIG. 1, FIG. 2, and FIG. 3 cooperate to illustrate a non-limiting example of a radar assembly 10, hereafter referred to as the assembly 10. The assembly 10 may be part of a larger radar system (not shown), where the assembly 10 provides a transition means between different types of waveguides used to propagate electromagnetic energy in the radar system from one location to another location.

The assembly 10 includes a rectangular-waveguide 12 or RWG 12 that propagates the electromagnetic energy 14 in a transverse electric mode (TE10) and in a first direction 16. The first direction 16 is illustrated as a double-ended arrow because, as will be recognized by those in the art, the RWG 12 can be used to propagate the electromagnetic energy 14 into (i.e. towards) the assembly 10, or out of (i.e. away from) the assembly 10. The physical size of the RWG 12 is selected based on the operating frequency of the radar system using well-known design rules.

The assembly 10 also includes a printed-circuit-board 18 that includes a plurality of conductor-layers 20 oriented parallel to each other. The physical dimensions and materials used for dielectric-layers 22 and the plurality of conductor-layers 20 are selected based on the operating frequency of the radar system using well-known design rules. By way of example and not limitation, the plurality of conductor-layers 20 may include eight conductor layers: L1, L2, L3, L4, L5, L6, L7, and L8 (FIG. 3). Some of these conductor layers (e.g. L3-L8) may be configured (e.g. processed using known photo-etching techniques) to define a substrate-integrated-waveguide 24 or SIW 24 that propagates the electromagnetic energy 14 in or using a transverse electric mode (TE10) to propagate the electromagnetic energy 14 in a second direction 26 perpendicular to the first direction 16. In this example layer L8 is further configured to define a slot-radiator 28 that may be used to couple the electromagnetic energy 14 from the SIW 24 to, for example, and antenna (not shown).

The assembly 10, or more specifically the printed-circuit-board 18, also includes or defines a transition 30 that propagates the electromagnetic energy 14 between the rect-angular-wave-guide 12 and the substrate-integrated-wave-guide 24. As noted above, it is contemplated that the electromagnetic energy 14 could be in either direction; either from the rectangular-wave-guide 12 to the substrate-integrated-waveguide 24, or from the substrate-integrated-waveguide to the rectangular-wave-guide 12. The transition 30 includes a plurality of apertures 32 defined by at least three (e.g. L1-L3) of the plurality of conductor-layers 20. That is, the transition 30 includes or is defined by at least three instances of apertures. In this example, the transition 30 includes or is defined by a first layer 20A (L1) of the plurality of conductor-layers 20 that is adjacent to or in contact with the rectangular-waveguide 12. The first layer 20A defines a first aperture 32A characterized by a first-size 34. The transition 30 also includes a last layer 20B (L3) of the plurality of conductor-layers 20 that is adjacent to the substrate-integrated-waveguide 24, where the last layer 20B also defines a horizontal-boundary 36 of the substrate-integrated-waveguide 24. With respect to the transition 30, the last layer 20B defines a last aperture 32B characterized by a last-size 34B that is greater than the first-size 34A.

The transition 30 also includes or is defined by one or more instances of an intermediate layer 20C of the plurality of conductor-layers 20 located between the first layer 20A and the last layer 20B of the transition 30. The intermediate layer 20C defines an intermediate aperture 32C characterized by an intermediate-size 34C with a value between the last-size 34B and the first-size 34A. It is contemplated that the transition 30 could have more than a single instance of the intermediate layer 20C between the first layer 20A and the last layer 20B so that the transition 30 would include or be formed by more than three instances of the apertures 32. That is, it is contemplated that the transition 30 could consist of additional apertures in addition to the intermediate aperture 32C between the first aperture 32A and the last aperture 32B. The progression or variation of the sizes of the apertures 32 may be determine or optimized using known design techniques. For example, the dimensions of the apertures 32 may be optimized on 3D-EM software HFSS for efficient transfer of energy and impedance matching between the RWG 12 and the SIW 24 over wide frequency range.

In order to reduce the amount of the electromagnetic energy 14 that leaks out of the transition 30 so is not communicated between the rectangular-wave-guide 12 and the substrate-integrated-waveguide 24. The transition 30 may also include one or more instances of a short wall 38 that serves to define a vertical-boundary 40 of the transition 30. The short wall 38 may be formed of an arrangement of vias 42, which may be part of the vias 42 used to define the SIW 24.

Accordingly, a radar assembly (the assembly 10) is provided. The assembly 10 provides a wideband transition (the transition 30) between the rectangular waveguide 12 (RWG 12) to the substrate integrated waveguide 24 (SIW 24) using the inner layers of a multilayer PCB (printed-circuit-board 18) for operation in the W-band of the electromagnetic spectrum. The transition is formed by a series of apertures through conductive layers (e.g. L1 thru L3). The transition 30 is advantageously and economically provided by using a multi-layered PCB processed using standard PCB processing technology typically used for the W-band. As such, no special flanges or metal structures are necessary, so the expense and critical tolerances associated features are avoided.

While this invention has been described in terms of the preferred embodiments thereof, it is not intended to be so limited, but rather only to the extent set forth in the claims that follow.

I claim:

1. An assembly comprising:
   a rectangular-waveguide (RWG) that propagates electromagnetic energy in a transverse electric mode TE10 and in a first direction; and
   a printed-circuit-board that includes a plurality of conductor-layers oriented parallel to each other, said printed-circuit-board defines a substrate-integrated-waveguide (SIW) that propagates electromagnetic energy in a transverse electric mode TE10 and in a second direction perpendicular to the first direction, and defines a transition that propagates the electromagnetic energy between the rectangular-wave-guide and the substrate-integrated-waveguide, wherein the transition includes apertures defined by at least three of the plurality of conductor-layers.

2. The assembly in accordance with claim 1, wherein a first layer of the plurality of conductor-layers is adjacent the rectangular-waveguide, said first layer defines a first aperture characterized by a first-size, and a last layer of the plurality of conductor-layers is adjacent to the substrate-integrated-waveguide and defines a horizontal-boundary of the substrate-integrated-waveguide, said last layer defines a last aperture characterized by a last-size greater than the first-size.

3. The assembly in accordance with claim 2, wherein an intermediate layer of the plurality of conductor-layers is located between the first layer and the last layer of the transition, said intermediate layer defines an intermediate aperture characterized by an intermediate-size between the last-size and the first-size.

4. The assembly in accordance with claim 1, wherein the transition includes a short-wall that defines a vertical-boundary of the transition.

* * * * *